(12) United States Patent
Buck

(10) Patent No.: US 6,284,201 B1
(45) Date of Patent: *Sep. 4, 2001

(54) APPARATUS FOR THE CATALYTIC PURIFICATION OF FLOWING GASES, IN PARTICULAR EXHAUST GASES OF INTERNAL COMBUSTION ENGINES

(76) Inventor: Alfred Buck, Nagolder strasse 32, D-72108 Rottenburg (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/102,095

(22) Filed: Jun. 22, 1998

Related U.S. Application Data (62) Continuation of application No. 08/796,221, filed on Feb. 7, 1997, now abandoned, which is a continuation of application No. 08/718,011, filed on Sep. 3, 1996, now abandoned, which is a continuation of application No. 08/313,109, filed as application No. PCT/DE94/00113 on Feb. 2, 1994.

(30) Foreign Application Priority Data

Feb. 10, 1993 (DE) .................................................. 43 03 850

(51) Int. Cl.$^7$ .......................... B01D 53/34; B01D 53/94; B01J 35/06; F01N 3/021
(52) U.S. Cl. .......................... 422/177; 422/171; 422/174; 422/180; 55/521; 55/DIG. 30; 445/304
(58) Field of Search .................................... 422/171, 177, 422/174, 179, 180, 211; 442/304; 55/521, 523, 527, DIG. 43, 486, DIG. 30; 502/527.15

(56) References Cited

U.S. PATENT DOCUMENTS

| | | | |
|---|---|---|---|
| 3,949,109 | | 4/1976 | McBride .............................. 428/34.5 |
| 3,956,185 | * | 5/1976 | Yagi et al. ...................... 502/527.15 |
| 4,205,971 | | 6/1980 | Abthoff et al. ......................... 55/330 |
| 4,278,717 | | 7/1981 | Aoyama ................................ 422/179 |
| 4,324,572 | | 4/1982 | Erdmannsdörfer .................. 55/385.1 |
| 4,397,772 | | 8/1983 | Noakes et al. ........................ 422/177 |
| 4,725,411 | | 2/1988 | Cornelison ........................... 422/180 |
| 4,863,700 | | 9/1989 | Ten Eyck .............................. 422/179 |
| 4,940,476 | | 7/1990 | Buck ....................................... 55/486 |
| 5,174,969 | | 12/1992 | Fischer et al. ....................... 422/180 |
| 5,190,571 | | 3/1993 | Fay et al. .............................. 55/523 |
| 5,258,164 | | 11/1993 | Bloom et al. ........................ 422/174 |
| 5,298,046 | * | 3/1994 | Peisert ............................ 55/DIG. 30 |

FOREIGN PATENT DOCUMENTS

| | | |
|---|---|---|
| 1151 720 | 7/1963 | (DE) . |
| 3545 762 | 7/1987 | (DE) . |
| 37 31 766 | 3/1989 | (DE) . |
| 38 01 634 | 8/1989 | (DE) . |
| 92 11 810 | 1/1993 | (DE) . |
| 41 37 105 | 5/1993 | (DE) . |
| 0 387 394 | 9/1990 | (EP) . |
| 0 542 124 | 5/1993 | (EP) . |

* cited by examiner

Primary Examiner—Hien Tran
(74) Attorney, Agent, or Firm—Foley & Lardner (57) ABSTRACT

An apparatus for the catalytic purification of flowing gases, in particular exhaust gases of internal combustion engines, is constructed having a catalyst body through which gas flows, which catalyst body comprises a knitted fabric whose heat-resistant fibrous material is coated with a catalytically active material.

24 Claims, 8 Drawing Sheets

APPARATUS FOR THE CATALYTIC PURIFICATION OF FLOWING GASES, IN PARTICULAR EXHAUST GASES OF INTERNAL COMBUSTION ENGINES

This application is a continuation of application Ser. No. 08/796,221, filed Feb. 7, 1997 now abandoned, which is a continuation of Ser. No. 08/718,011, filed Sep. 3, 1996, now abandoned, which is continuation of Ser. No. 08/313,109, filed Oct. 7, 1994, now abandoned which is a 371 of PCT/DE94/00113 filed Feb. 2, 1994.

The invention relates to an apparatus for the catalytic purification of flowing gases, in particular exhaust gases of internal combustion engines, having a housing to be arranged in a gas flow path, which housing contains a gas-permeable support in the form of a textile sheet material made of heat-resistant fiber material onto which a catalytically active material is applied.

The catalytic converters conventional for the exhaust gas purification of motor vehicle engines, in particular internal combustion engines are composed throughout of ceramic monoliths in the form of extruded cellular bodies which are coated on the surfaces swept by the exhaust gas with a catalytically active material, in particular platinum. These mechanically sensitive monoliths are accommodated in metal housings in which they must be elastically supported, which is accompanied by certain problems. In order to obtain a sufficiently large surface area, before the application of the catalytically active material they must be coated with a so-called "washcoat", which, however, rapidly alters at temperatures above 800° C. Because of this thermal sensitivity, these catalytic converters cannot be arranged directly on the engine. On the other hand, the arrangement at a relatively large distance from the engine, together with the considerable mass of the monoliths, is accompanied by the disadvantage that heating up the monoliths to the operating temperature after a cold start requires a relatively long time. During this heating-up period, the catalytic converter is thus active only to a limited extent. Since the exhaust gases essentially flow in laminar flow through the cellular body of the monolith, the conversion rate is also restricted on principle.

Austrian Patent 61 419, furthermore, discloses using filters for the purification of exhaust gases, in particular of internal combustion engines, which filters have fibers made of a heat-resistant polycrystalline material having a crystallite size between 50 and 500 angstroms. Polycrystalline aluminum oxide or zirconium oxide are preferred for this fibrous material. However, in principle, metal oxides having a temperature stability up to 900° C. can be used.

In order to decrease the temperature at which soot particles separated out from the exhaust gas stream are burnt, the fibers can be coated with a catalytic material, in particular silver, bismuth, lead, uranium, cobalt, etc. To remove undesirable gaseous components, for example carbon monoxide or hydrocarbons, from the exhaust gases it is also known, in the case of this filter, to coat zirconium oxide fibers with finely divided platinum.

The fibrous material is used in the filters in the form of loose staple fibers, paper, woven fabric, films, cardboard or felt, filter elements also being able to be used in which paper (or corrugated cardboard), or yarn, or felt produced from such fibrous material is loosely wound up to form a filter body through which gas flows. Filter bodies made of loosely packed fibrous material are problematic because the non-interlocked fibers become free with time, whereas in the case of fibers processed to form paper, felt, cloth or like linear textile sheet materials, either their resistance to flow is too high or there is the risk that the filters plug relatively rapidly. Moreover, the surface of the incorporated fibers is exposed to a very restricted extent, the exposed fiber surface being further increasingly reduced in operation. At any rate, catalytically active filters of this type have not hitherto achieved economic importance.

The object of the invention, in contrast, is to create an apparatus for the catalytic exhaust gas purification ("catalytic converter") which can be used in particular in the exhaust gas purification of internal combustion engines and which features mechanical resistance with high activity.

To achieve this object, the apparatus according to the invention mentioned at the outset is characterized in that the support for the catalytically active material is a knitted fabric.

The fibrous material advantageously contains ceramic microfibers, which are taken to mean fibers having a diameter of 3 $\mu$m and more. In particular polycrystalline mullite fibers have proved to be expedient, but other heat-resistant fibrous materials are also suitable. Thus the fibrous material for certain application purposes can also contain carbon fibers or can be composed entirely of these. The surface area of the fibers of the fibrous material is expediently between 0.2 and 0.4 $m^2$/g and above, without this range representing a restriction of the fibers usable in principle.

A knitted fabric whose fibers form the support for the catalytically active material offers, as has been shown, a high mass transfer to the fiber surfaces with a simultaneous outstanding hydraulic configuration. It has bulk elasticity and is insensitive to vibrations and pulsations of the gas flow. The fibers coated with the catalytic material are dimensionally pretensioned and firmly incorporated in the knitted fabric. Nevertheless, their surface is substantially open; they can move with respect to each other to a limited extent, so that stresses are reduced and damped. The extensively exposed fiber surface ensures a maximum catalytic activity.

The structure of the knitted fabric forms a versatile pore system in which resistance elements are contained, so that even in the case of laminar through-flow, extensive wall contact and thus high mass transfer results in all flow regions, as is essential for good catalytic activity. Within the knitted fabric itself, the flow path is branched several times with the result that the individual fibers supporting the catalytically active material are impinged by the flow over a large surface area.

Because of its special structure, the knitted fabric additionally ensures outstanding mixing of an exhaust gas stream linear with respect to concentration or temperature. From this there results a particular advantage in the case of multiple cylinder internal combustion engines and the so-called lambda 1 technology. Finally, such a knitted fabric has good noise insulation properties, it acting, moreover, as a filter for particulate pollutants, for example soot particles.

The good bonding of the fibers in the knitted fabric already mentioned has the effect that fiber fragments possibly occurring remain substantially anchored in the knitted fabric, while, on the other hand, progression of damage from one damaged site which has occurred virtually does not take place. Short fiber yarns can therefore also be used.

The knitted fabric can be made in at least a double-threaded manner from various fibrous materials of which the fibers of the one and/or of the other fibrous material can support the same or different catalytically active material. At least one metallic thread can also be worked into the knitted fabric, which metallic thread gives the knitted fabric, for example, an additional dimensional stability. It is also conceivable to work carbon fibers having an enlarged surface area (activated carbon fibers) into the knitted fabric, in order by this means to create the opportunity, for example during the cold start phase, of temporarily adsorbing unburnt hydrocarbons occurring and of desorbing again the substances adsorbed in this way in a subsequent period (peak emission).

For this purpose, the knitted fabric can contain electrically conducting fibers which are electrically conductively connected to connection means for an electric power source and which thus permit direct internal heating of the knitted fabric. However, this internal heating can be used not only for the desorption of adsorbed substances, but in particular, also, during the cold-start phase, to bring the knitted fabric containing the catalytically active material rapidly to the operating temperature. The electrically conducting fibers can be carbon fibers or metal fibers in the form of metal wires etc.

The carbon fibers, on their surface, can also bear an electrically insulating coating, for example $SiO_2$. For this purpose, SiC, which is converted by the action of heat into $SiO_2$, is applied to the fibers. Such an $SiO_2$ coating simultaneously forms a protection against oxidation.

The fibrous material is worked into the knitted fabric generally in the form of yarns made from staple fiber or continuous filaments. Yarn hanks from continuous filaments, in the knitted fabric, essentially have only one beginning and one end and thus offer a low surface area for degradation. Staple fibers, in contrast, with their fiber ends projecting from the yarn hanks give a somewhat larger surface area and improved filter action. Which of the two types of fiber—which if appropriate can also be used in a mixture—is preferred in the individual case depends on the conditions of use. It is also conceivable in principle that the knitted fabric contains fibrous material in the form of rovings.

In each case, fibers having a rough surface are to be preferred to smooth fibers. By influencing the surface topography of the fibers, the surface, as has been shown, can be increased by approximately the factor 20.

The yarn material used for the knitted fabric should be twisted as little as possible, for precisely which reason rovings are also suitable. In practice, yarn having up to one twist per inch of length has proved to be advantageous. Texturized loosened yarn is frequently to be preferred.

When the flow passes through the knitted fabric, the flow should find as far as possible no resistance-free routes along the "coarse pores" due to the mesh structure. This can be avoided by the fact that the knitted fabric is used in such a way that the gas flows through it essentially in the plane of the knitted fabric. Another method comprises compacting the knitted fabric in order to close the "coarse pores". However, this is generally connected with an increase of the resulting flow resistance and thus of the pressure drop occurring at the knitted fabric.

In a knitted fabric, the loop bows still remain curved even with high local stretching, that is the fibers, in contrast to the conditions in woven fabrics or in a coil, are never completely extended. This has the consequence that the pretensioning of the fibers remains restricted, so that the yarn hanks remain loose with respect to each other in the yarn hank and offer large open active surfaces. In order to alter this pretensioning, it can be expedient if the knitted fabric is held under a predetermined tension in the direction of the wales and/or of the courses. In the housing passing the gas stream to be purified through the catalytically active knitted fabric, the knitted fabric can be arranged, using differing fabrication techniques, to fill the catalytic converter volume through which flow is to pass. Thus it is possible that the knitted fabric is, in part, rolled up or folded; it can also, at least in part, be pleated or doubled. It has proved to be advantageous if the knitted fabric has been produced by circular knitting. The knitted tube thus formed can then be rolled up in itself or as mentioned pleated, folded or arranged in another manner appropriate to the purpose. It is also conceivable in principle to twist this tube together, for example to form a "rope" and to wind it up in a spiral shape in this form on a spindle—possibly in several layers.

Since, when appropriate fibrous material is used, for example ceramic fibers which are coated with the catalytically active material, the knitted fabric is resistant to high temperature, the catalytic converter produced from this knitted fabric can also be arranged immediately downstream of the outlet valves of an internal combustion engine. The knitted fabric ensures anchoring of the fibers in the loop interlocking such that it can withstand the exhaust gas stream pulses which are still strongly expressed in this region, at the same time the pressure drop caused by the knitted fabric being so small that it does not significantly impair the function of the internal combustion engine. The knitted fabric, in an appropriate fabrication, can if required also be arranged directly in the exhaust manifold of the internal combustion engine in such a way that this—or a connecting part of the exhaust pipe—if necessary forms the housing for the catalytic converter. An arrangement of this catalytic converter upstream of an exhaust gas turbocharger or pressure-wave charger possibly present is conceivable.

Finally, in principle, the catalytically active material can be applied to the knitted fabric or to the yarn prior to knitting. In certain cases, application to the individual filaments before their processing to form a yarn is also conceivable.

BRIEF DESCRIPTION OF THE DRAWINGS

In the drawing, exemplary embodiments of the subject-matter of the invention are represented. In the figures.

Figure 1:
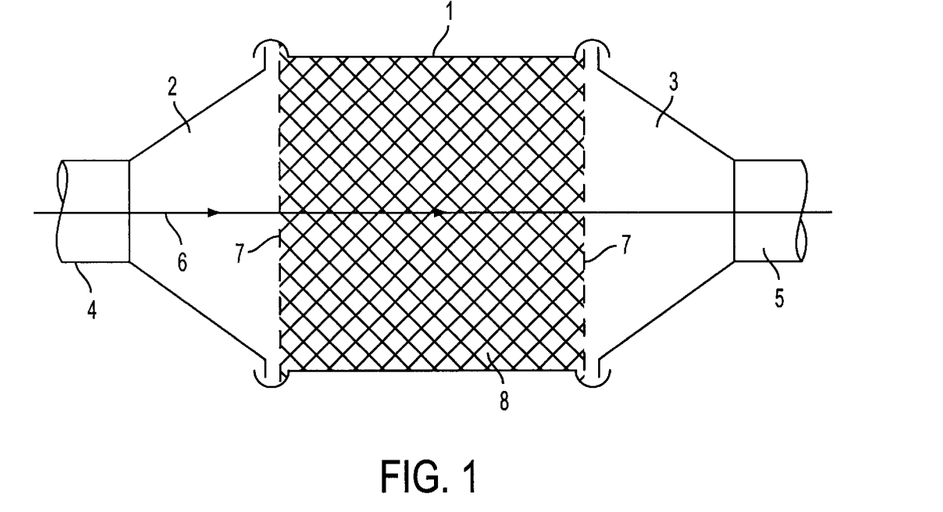
FIG. 1 shows an apparatus according to the invention in the form of a catalytic converter intended for arrangement in the exhaust pipe of an internal combustion engine in axial section, in a side view and in diagrammatic representation.
Figure 2:
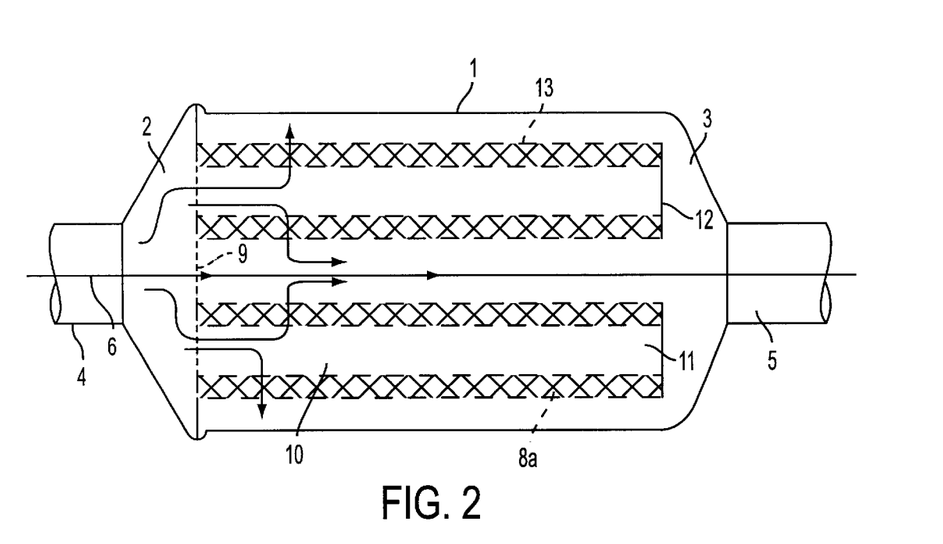
FIG. 2 shows an apparatus resembling FIG. 1 in a modified embodiment and in a corresponding representation.

In FIGS. 1, 2, two conventional basic shapes of catalysts for internal combustion engines are represented diagrammatically. They each have a sheet metal housing 1 which is preferably cylindrical or oval in cross section, which sheet metal housing 1 is connected at both ends via an inlet or outlet funnel 2 or 3 to an inlet-side and an outlet-side pipe connector piece 4 and 5 respectively which permits the housing 1 to be arranged in the exhaust pipe of an internal combustion engine, which is not depicted in more detail, in such a manner that in operation the exhaust gases to be purified flow evenly through the housing interior in the axial direction indicated in 6.

In the simple embodiment according to FIG. 1, a gas-permeable catalyst body 8 is arranged in the housing between two perforated plates 7, which catalyst body 8 completely fills the interior of the housing 1. In the so-called candle design according to FIG. 2, in contrast, a plurality of axially parallel cylindrical catalyst units 10 are accommodated in the housing 1 attached to an appropriately designed perforated plate 9, of which catalyst units each essentially comprises a candle-shaped housing 11 which is closed on a bottom side at 12 and is manufactured from perforated sheet metal 13 at the periphery. Each of the candle-shaped housings 11 is lined internally with a gas-permeable cylindrical catalyst body 8a through which, in operation, exhaust gases flow essentially radially from the interior to the exterior.

The catalyst body 8 or 8a comprises a gas-permeable support in the form of a knitted fabric which contains catalytically active fibrous material and is fabricated in correspondence with the shape of the catalyst body 8, 8a.

Figure 3:
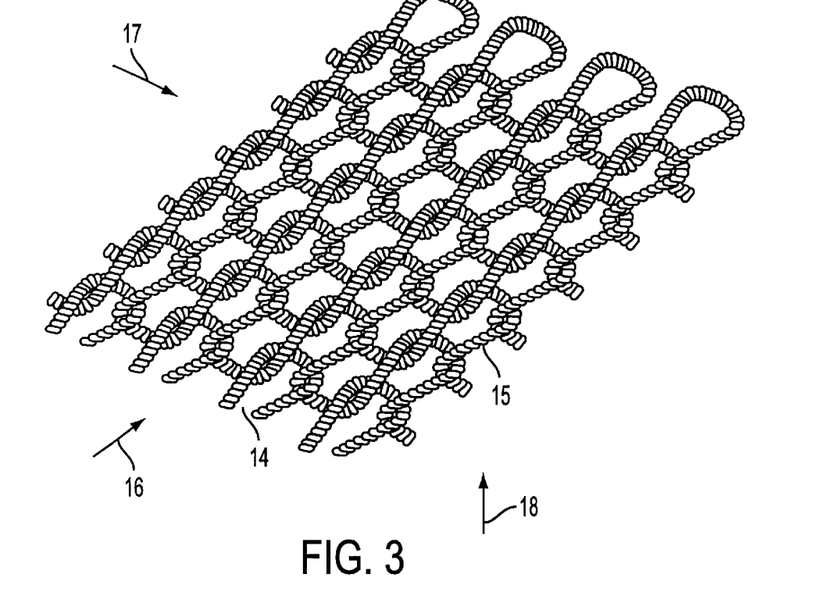
FIG. 3 shows a knitted fabric of the catalytic converter according to FIG. 1 or 2, which knitted fabric is coated with a catalytically active material, in detail in perspective representation showing various inflow directions.
Figure 4A:
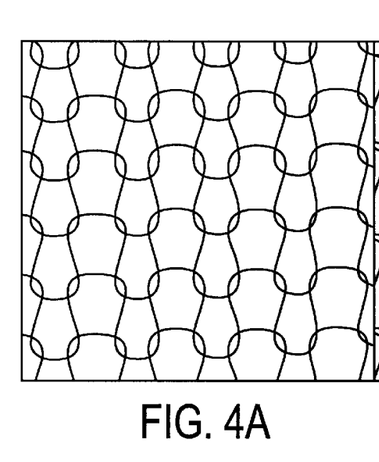
FIG. 4 shows the knitted fabric according to FIG. 1 in plan view in detail showing various extension states.
Figure 4B:
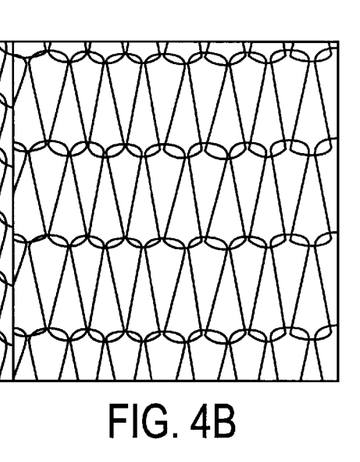

The knitted fabric of which a detail is represented at 14 in the FIGS. 3, 4 can, as shown, be a plain jersey knitted fabric, but other single- and multi-layer knitting stitches are also conceivable depending on the respective application. These knitted fabrics can also be worked with stitch patterns, e.g. with tuck loops; they can also have different stitching in different sections. As can be seen by comparison of the two diagrams a and b of FIG. 4, which show the same knitted fabric 14 once unstretched (a) and once stretched in the direction of the wales (b), the loop bows are still curved even in the case of high local stretching. In contrast to the conditions in a woven fabric or a wick-like fiber coil, the fibers are never completely stretched. As long as the knitted fabric is not overextended—which is to be excluded by suitable fabrication—the fibers remain movable with respect to each other in the yarn hank, so that their catalytically active surface remains essentially completely accessible for impingement by the exhaust gas to be purified flowing through the catalyst body 8, 8a.

The knitted fabric 14 is made from a yarn 15 which, depending on its structure, can be composed of staple fibers (FIG. 5) or of continuous filaments or of a mixture of both fiber types. In principle, the yarn 15 can be single- or multiple-threaded, in individual cases so-called core-spun yarns also being suitable.

Figure 5:
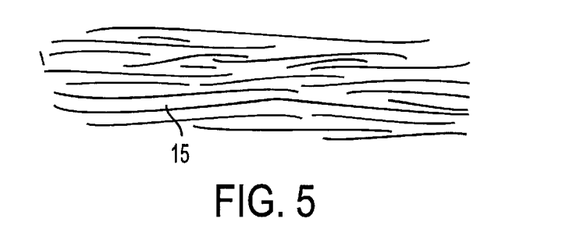
FIG. 5 shows a slightly twisted yarn of the knitted fabric according to FIG. 3 in detail in diagrammatic representation and to a different scale.
Figure 6:
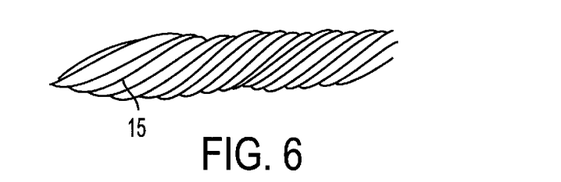
FIG. 6 shows a highly twisted yarn in comparison to FIG. 5 in detail and in a corresponding representation.

In general, the yarn 15 is to be twisted as little as possible in order to expose as large as possible a fiber surface area. This can be taken without difficulty from FIGS. 5, 6, of which FIG. 5 shows a slightly twisted yarn 15 and FIG. 6 shows a highly twisted yarn 15. The slightly twisted yarn 15 according to FIG. 5 has a structure which permits the exhaust gas to flow through the yarn itself; the greater the yarn is twisted, the higher is also the resistance to through-flow for the exhaust gas.

Yarns having approximately 0.5 twists per inch of length or even rovings have produced good results in practice. Texturized loosened yarn is also advantageous.

The fibrous material from which the yarn 15 is processed must have a heat resistance which permits it to withstand, for long operating periods, the operating temperatures occurring.

The relevant temperature range, according to experience, is between approximately 200° and 800° C. With respect to the largest possible surface area, microfibers are advantageous, which is taken to mean fibers having a fiber diameter of about 3 $\mu$m and more.

The material of which the fibers are composed is generally a ceramic material but, depending on the temperature range for which the catalytic converter is intended, other organic and inorganic materials are also useful in principle. All metal oxides are highly suitable. Pure carbon fibers have also already been used which offer a great number of advantages, for example electrical conductivity. The surface area of the fibers can be increased by appropriate measures. Thus, e.g. fibers having a rough surface are generally to be preferred to smooth fibers. By influencing the surface topography, the surface area can be increased according to experience by about the factor 20. In the case of carbon fibers, so-called activated carbon fibers can be processed which have a significantly increased surface area and can thus also be simultaneously used as an absorbent, for example during the cold-start phase.

In general it must be stated that different yarns or threads, which can also be composed of different materials, can also be worked into the fabric 14 so that to them various functions [lacuna] made single-threaded and multi-threaded and contain, for example, at least one metallic thread which, inter alia, gives the knitted fabric 14 and thus the catalyst body 8, 8a a certain dimensional stability which can be of importance, depending on the chosen fabrication of the catalyst body 8, 8a and the operating conditions.

The construction of the catalyst body 8, 8a from the knitted fabric 14 can take place in various ways as will be described in detail with reference to some examples. In principle, however, it must be established that the flow through the knitted fabric 14 must take place in such a way that the gas flow does not find any resistance-free routes along the coarse pores or "loop caves" present in principle in a knitted fabric because of the loop structure. In particular, when the exhaust gas to be purified in the catalyst body 8, 8a is not forced to flow through a plurality of knitted layers lying one above the other and, as a result, to follow branched flow channels, care must generally be taken that the flow passes through the knitted fabric 14 roughly in the plane of the knitted fabric as is indicated in FIG. 3 by the arrows 16, 17. Throughflow transversely to the knitted fabric plane in accordance with the arrow 18 is, as mentioned, at least in the case of single-layered arrangement of the knitted fabric 14, less expedient as a simple glance at FIG. 4 shows in which the "coarse pores", situated between the individual loop sides and loop bows, of a knitted fabric 14 (made from a smooth thread) are shown in principle.

Figure 7:
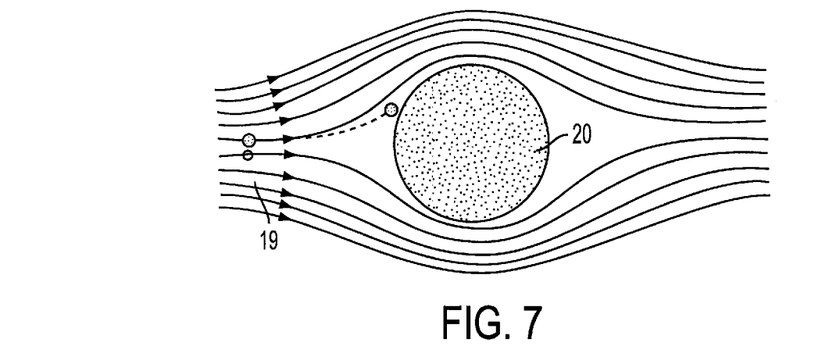
FIG. 7 shows a diagrammatic drawing to show the inflow conditions of a fiber of the knitted fabric according to FIG. 3.
Figure 8:
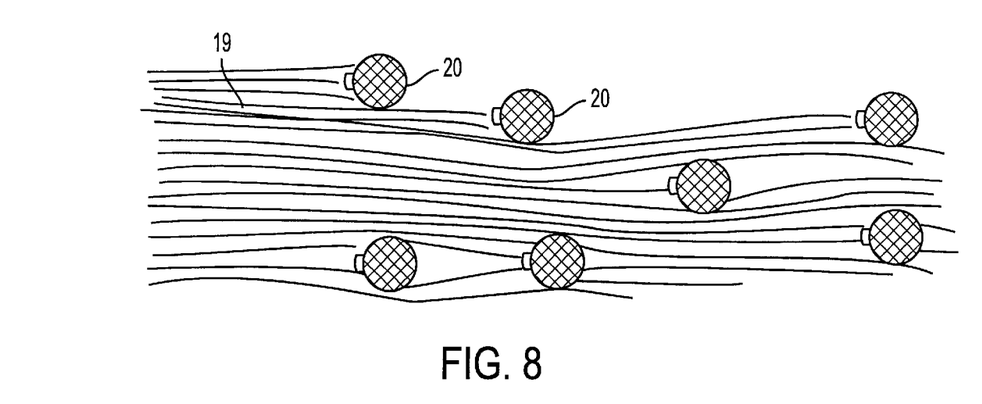
FIG. 8 shows a diagrammatic representation of the fundamental inflow conditions in the knitted fabric according to FIG. 3 in a sectional drawing.

In the case of throughflow in the knitted fabric plane, in principle the flow conditions represented in FIG. 8 are produced in which it is ensured that the exhaust gas stream 19 on its flow path repeatedly meets flow resistances in the form of individual fibers 20 round which flow passes over the largest possible area in the manner to be seen in FIG. 7.

Fabrication methods for the knitted fabric 14 which are suitable for producing the catalyst body 8, 8a supplying the catalyst volume through which flow is to pass are shown by way of example in FIGS. 9 to 17. The exemplary embodiments shown are not exhaustive; they can also be combined together or supplemented by other fabrication methods.

Figures 9, 10:
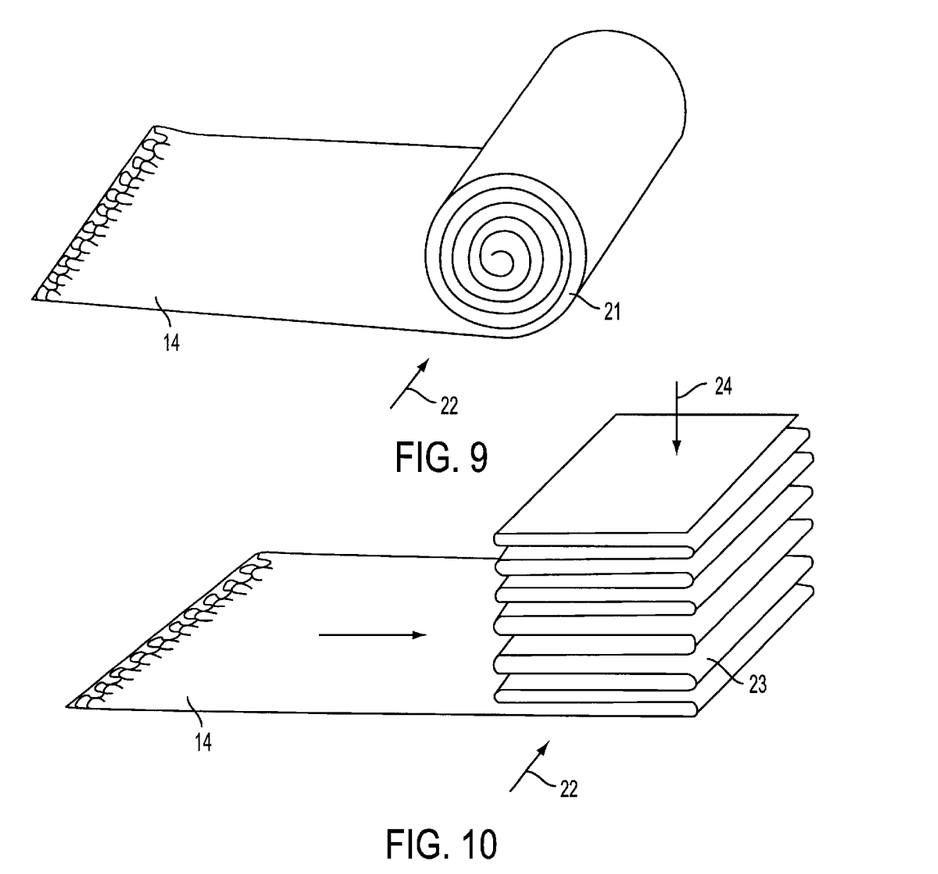
FIG. 9 shows the knitted fabric according to FIG. 3 in rolled form in diagrammatic perspective representation, showing the influx conditions of the coil thus formed.
FIG. 10 shows the knitted fabric according to FIG. 3 in pleated form in diagrammatic representation, showing the influx conditions.

In the embodiment according to FIG. 9, the knitted fabric 14 is rolled up to form a simple coil 21 which, for example, simply forms the catalyst body 8 of the catalytic converter according to FIG. 1. For the reasons already explained, it is expedient to take care in use that the flow passes through the coil 21 in the axial direction as indicated by an arrow 22. Transverse throughflow (perpendicular to the axis) is possible but less advisable.

In the embodiment according to FIG. 10, the knitted fabric 14 is pleated, i.e. folded up to form a stack 23 of layers lying one above the other of the knitted fabric folded in a concertina-like manner. The best throughflow direction is again indicated by two arrows 22; it proceeds in the knitted fabric plane of the individual layers. A transverse flow, as given by an arrow 24, is likewise possible in principle but less advantageous.

Figure 11:
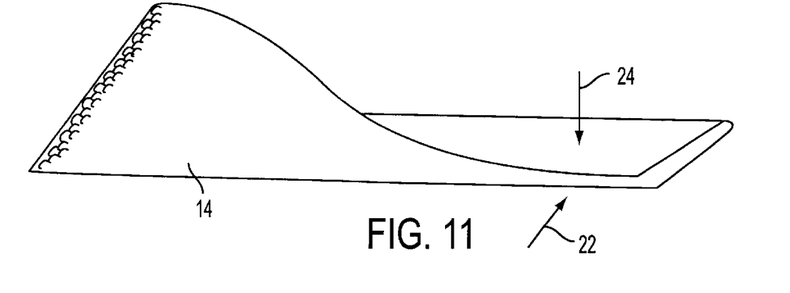
FIG. 11 shows the knitted fabric according to FIG. 3 in folded form, showing the influx conditions.

FIG. 11 shows an exemplary embodiment in which the knitted fabric 14 is folded. The folding here can be single- or multi-layered; it can proceed in the direction of the wales or of the courses. Folds are also possible in which at least one fold is made in the direction of the wales or courses and at least one subsequent fold is performed transversely thereto. The preferred throughflow direction in the knitted fabric plane is given by the arrow 22 for the fold represented; the statement made for the exemplary embodiment according to FIG. 10 applies to a throughflow in the transverse direction thereto in correspondence with the arrow 24.

The embodiments according to FIGS. 12 to 16 start from a knitted fabric 14 which was produced in the form of a circular-knitted tubular fabric 140. Such a tubular fabric permits hollow shapes to be produced simply which are expedient for many applications. Very simple conditions result if this tubular fabric—preferably multilayered—is pulled in the manner of a sock onto an appropriate candle-shaped gas-permeable housing 11 according to FIG. 2 or is inserted as a hollow cylinder into a said housing 11.

Figure 12:
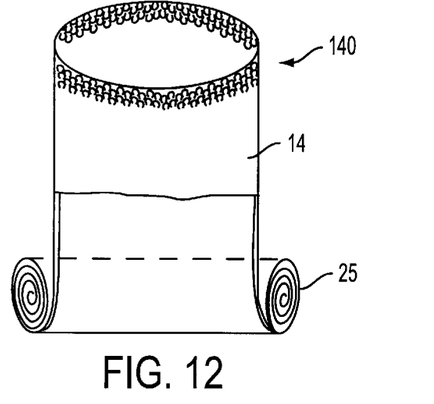
FIG. 12 shows the knitted fabric according to FIG. 3 in the form of a circular-knitted tubular fabric which is wound up in part to form a ring (torus), in diagrammatic perspective representation.
Figure 13:
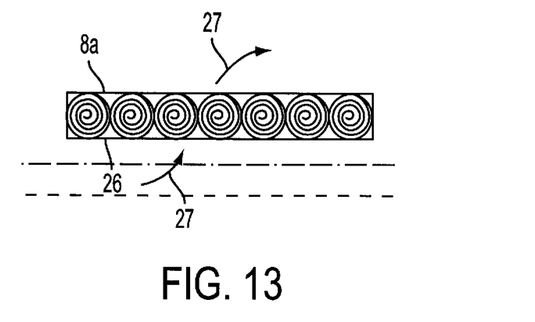
FIG. 13 shows an arrangement of a plurality of adjacent rings according to FIG. 12, showing the influx conditions in a diagrammatic sectional representation.

The embodiment according to FIG. 12 offers a larger fiber surface area active for the exhaust gases flowing through, in which embodiment the tubular fabric 140 is wound up to form a ring (torus) 25, a cylindrical hollow body indicated at 26 in FIG. 13 then being filled with such wound up rings or tori 25 in order to form the coiled body 8a. The gas throughflow direction is indicated by arrows 27; it runs transversely to the plane of the rings or tori 25.

Figure 14:
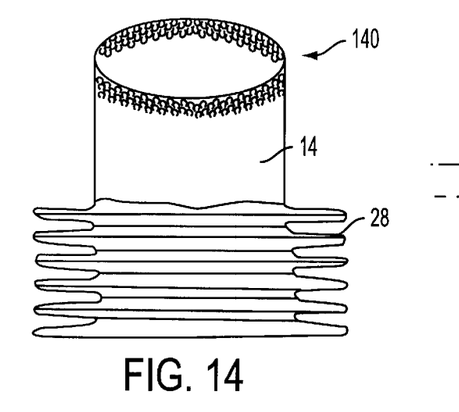
FIG. 14 shows the knitted fabric according to FIG. 3 in the form of a circular-knitted and then in part pleated tubular fabric in perspective diagrammatic representation, in part in section.
Figure 15:
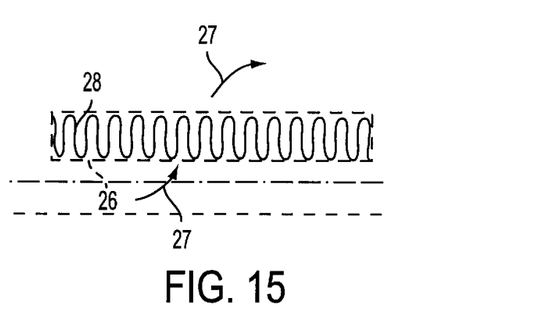
FIG. 15 shows the pleated circular-knitted product according to FIG. 14 in section in a side view showing the influx conditions and in diagrammatic representation.

FIGS. 14, 15 represent an embodiment in which the tubular fabric 140 is pleated in the depicted manner at 28. A cylindrical configuration results, the walls of which are composed of the layers lying one above the other of the knitted fabric 14 folded in a concertina-like manner. This hollow cylindrical configuration can in turn be inserted into the hollow body 26 or placed on an appropriate candle-shaped housing 11 (FIG. 2) or inserted into a said housing 11. An advantage of this embodiment is that in the radial throughflow direction indicated by the arrows 27, the flow passes essentially in the plane of the knitted fabric 14 through the layers of the pleated folds 28.

Figure 16:
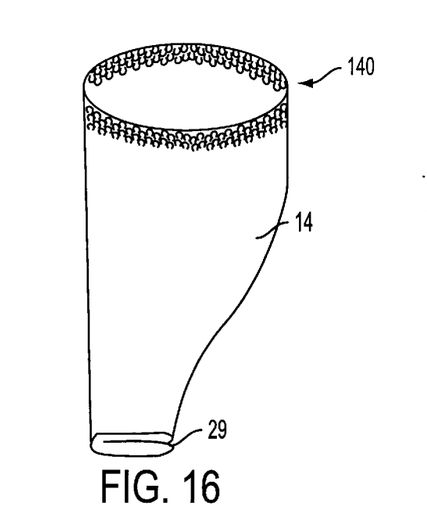
FIG. 16 shows the knitted fabric according to FIG. 3 in the form of an at least once-folded circular-knitted tubular fabric in perspective diagrammatic representation.
Figure 17:
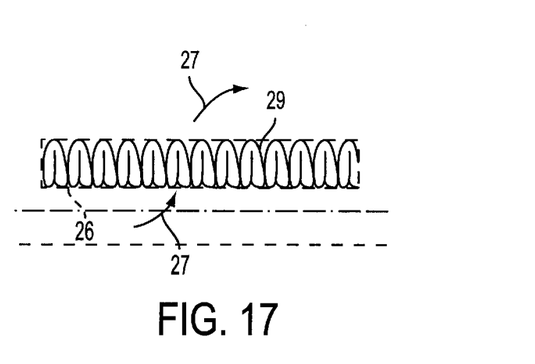
FIG. 17 shows the folded circular-knitted fabric according to FIG. 16 wound up helically and in axial section in a diagrammatic side view showing the influx conditions.

In the embodiment according to FIGS. 16, 17, finally, the tubular fabric 140 is folded once or several times about an axis extending in the longitudinal direction of the tube. The folded configuration 29 can then be wound up helically to form a filter candle which can either be accommodated in the hollow body 26 in the manner seen in FIG. 17 or be pulled onto a candle-shaped housing 11 according to FIG. 2 or arranged in the said housing 11. In this case also, the flow passes through the layers of the folded knitted fabric 14 essentially in the plane of the knitted fabric 14, as given by the arrows 27.

In principle, in all these fabrication methods, catalyst bodies 8, 8a of a circular cylindrical hollow body, noncircular cylindrical hollow body or hollow body of any desired shape can be produced. The, in particular, candle-shaped catalytic converter thus formed, as represented in FIG. 2, can be used either connected in parallel, but they can also be used connected one after the other or stacked one inside the other. In this manner a great increase of the active throughflow surface area is possible, at the same time low pressure drops being able to be achieved.

Whereas, in the embodiments of catalytic converters as are shown in FIGS. 1, 2, the catalyst body 8, 8a is accommodated in its own sheet metal housing 1, the characteristic of the knitted fabric forming this catalyst body also permits such a housing to be dispensed with for certain applications. Examples of this are shown in FIGS. 18 to 21 which show exemplary embodiments in which the catalytically active knitted fabric is accommodated directly in the exhaust manifold, indicated diagrammatically at 30, of an internal combustion engine 31.

Figure 18:
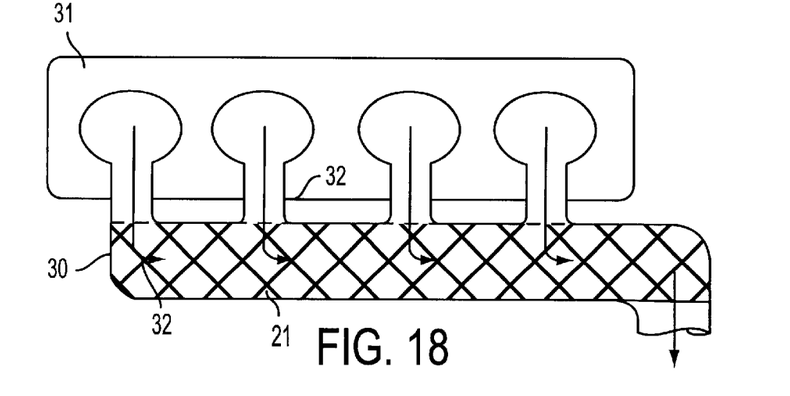
FIGS. 18 to 21 show an apparatus according to the invention in the form of a catalytic converter which is accommodated directly in the exhaust manifold of an internal combustion engine and which is shown in various embodiments and diagrammatic sectional representations.

In the embodiment according to FIG. 18, the knitted fabric 14 is rolled up to form a coil 21 in accordance with FIG. 9, which coil sits directly in the exhaust manifold 30 which thus forms the "housing" for the catalytic converter.

It is also conceivable in principle to arrange this coil 21 at another position of the exhaust pipe in such a way that the tubular wall thereof is utilized as catalytic converter housing. Arrows 32 indicate the gas throughflow direction.

Figure 19:
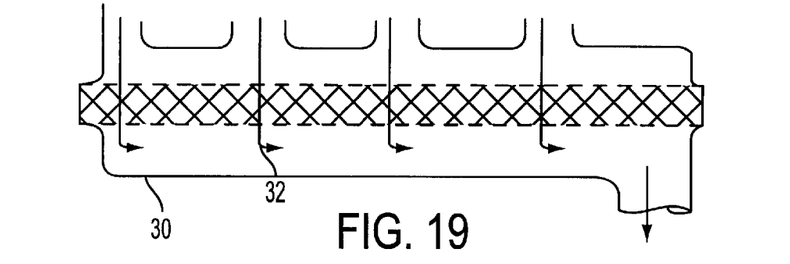
Figure 20:
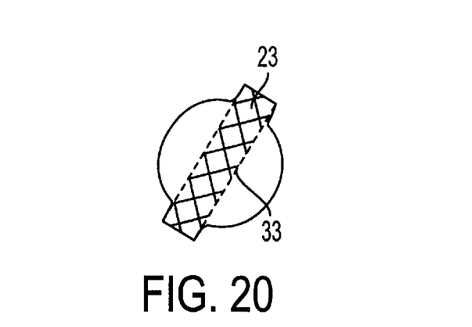

The embodiment according to FIGS. 19, 20 is differentiated from that according to FIG. 18 by the fact that a gas-permeable part-housing 33, essentially rectangular in cross section and extending over the length of the exhaust manifold 30 is introduced into the exhaust manifold 30, which part-housing contains the knitted fabric 14 which is pleated or folded, for example, in accordance with FIGS. 10, 11, roughly in the shape of a stack 23. The gas throughflow direction is in turn indicated by arrows 32.

Figure 21:
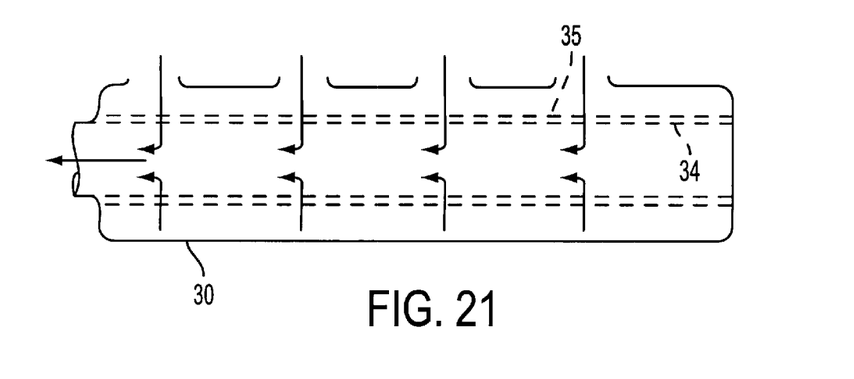

Finally, in the embodiment according to FIG. 21, a gas-permeable part-housing 34 extending over the length of the exhaust manifold 30 is inserted into the exhaust manifold 30, which part-housing bears a cylindrical knitted fabric casing 35 which is, if required, pleated in accordance with FIGS. 14, 15 or wound up in accordance with FIGS. 16, 17 in such a way that, overall, the fundamental construction results in a filter candle which lies in the exhaust manifold 30 and through the wall of which filter candle the flow essentially passes radially, as indicated by the arrows 32.

The catalytically active material preferably used is platinum if the exhaust gases of internal combustion engines are to be purified of unburnt hydrocarbons and of carbon monoxide. For other applications in which the conversion of other pollutants contained in the gas stream to be purified is to the fore, or in which the object given is to decrease the combustion temperature, for example for soot particles, other catalytically active materials can be used which sit on the fiber surface of the knitted fabric 14 and past which the gas stream to be purified flows. Examples are Pt, Pd, V, Rh, etc.

When platinum is used as catalytically active material, the platinum coating of the fibers can take place in various ways. The coating can be performed from the gas phase (chemical vapor deposition=CVD). Another process is wet impregnation. This process comprises the knitted fabric 14 being impregnated with a dilute solution of a platinum salt, whereupon the impregnated knitted fabric is dried and then the salt is thermally decomposed to platinum.

Depending on the reaction conditions in the thermal decomposition of the salt, three modifications of platinum can be formed: platinum black (platinum containing physisorbed oxygen), platinum sponge (noncrystalline high-surface area platinum without sorbed oxygen) and platinum metal (crystallized low-surface area platinum).

Exemplary Embodiment 1:

A knitted fabric 14 corresponding to FIG. 3 is produced from a fiber yarn of low twist (0.5 twists per inch of length) composed of a polycrystalline mullite fiber having a surface area of 0.2 to 4 m$^2$/g (second value with leaching). The fiber diameter is approximately 10 $\mu$m and is thus outside the region hazardous to health; however, fibers having a fiber diameter of 5 $\mu$m and correspondingly greater surface area can also be used.

The knitted fabric 14 was then impregnated in a dilute solution of a platinum salt (wet impregnation), whereupon the salt was then decomposed (calcined) at temperatures around 800° C. to give platinum sponge. The coating rate was approximately 1 percent by weight; however, it can be decreased to approximately 1 part per thousand by weight.

The knitted fabric 14 was then wound up to a coil 21 corresponding to FIG. 9 and flow was passed through axially. For this purpose, the coil 21 was inserted into a stainless steel tube 1 in accordance with FIG. 1.

Exemplary Embodiment 2:

A knitted fabric 14 was produced from carbon microfibers, which knitted fabric has a density of approximately 0.5 to 1.0 g/cm$^3$. The fibers are monofilaments having a fiber diameter of 6.5 $\mu$m; 3000 monofilaments are present per hank. The flow velocity based on standard conditions was approximately 85 mm/sec. Tests were carried out with CO-enriched air.

Even at approximately 235° C., complete conversion of CO into $CO_2$ resulted at a space velocity of 10,000 h$^{-1}$ (space velocity: throughput m$^3$ of gas/h per m$^3$ of catalyst volume).

Instead of a platinum catalyst, a rhodium catalyst or a Pt/Rh catalyst could also be used.

Exemplary Embodiment 3

Carbon fibers, as in exemplary embodiment 2, were first CVD-coated with SiC. A catalytic coating was then applied to the fibers by wet impregnation with a Pt/Pd mixture and subsequent calcination at approximately 800° C.

A coil 21 in accordance with exemplary embodiment 1 was produced from the knitted fabric, through which coil propane was passed axially.

At a space velocity of about 10,000 h$^{-1}$, the catalytic conversion of the propane began already at a starting temperature of approximately 210° C.; at approximately 330° C., a 100% conversion of the propane was observed.

For example, the use of carbon fibers as a support for the catalytically active material permits internal heating of the catalyst body 8, 8a to be directly performed, because the carbon fibers are electrically conducting. Another possibility for such an internal heating is that the knitted fabric 14 is made double-threaded, in addition to the yarn 15 which is, for example, composed of ceramic fibers and coated with catalytically active material, an electrically conductive yarn 36 is used for knitting which is plaited onto the yarn 15. An example of this is represented in FIG. 22, for which it should be noted that, as already explained at the outset, for purposes for which an internal heating of the knitted fabric 14 is not required, the second yarn 36 can also be composed of an electrically insulating material which is selected so that it gives the knitted fabric the additional properties required for the particular application.

It is also possible to incorporate inlaid threads 37 into the knitted fabric, which inlaid threads, when internal heating is desired, are composed of an electrically conductive material, but are otherwise produced from a material which was selected with respect to certain properties of the knitted fabric to be achieved. Such properties are, for example, increased dimensional stability, improved strength or certain elongation properties of the knitted fabric which are different in the direction of the courses from those in the direction of the wales.

Figure 23:
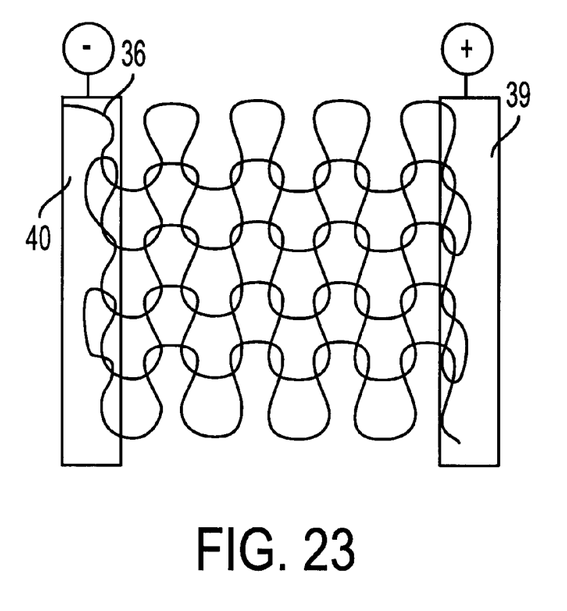
FIG. 23 shows a thread system of the knitted fabric according to FIG. 22. showing the electrical connection conditions.

The electrically conducting fibers can be connected in the manner visible in FIG. 23 with a power source not shown there in more detail. For this purpose, the yarn elements 36 of the knitted fabric 14 which are composed of these fibers are soldered or welded onto two contact strips 39, 40 to be electrically conducting, which in the case of carbon fibers, for example, can take place with the aid of an appropriate prior coating of the fibers. The contact strips 39, 40 essentially extend in the direction of the wales, i.e. transversely to the knitting direction. In this manner, definite resistance conditions result and a uniform current flow through the yarn lengths forming the individual courses results.

Figure 22:
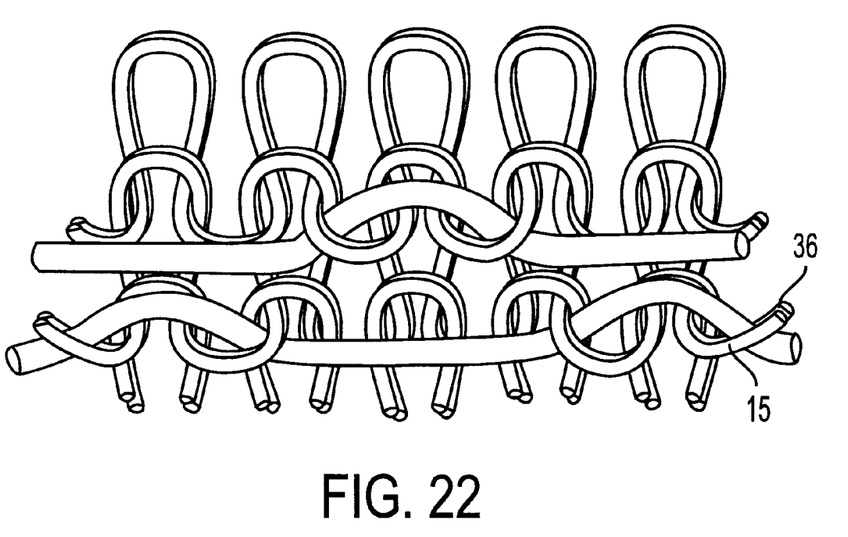
FIG. 22 shows the knitted fabric according to FIG. 3 in a modified embodiment in detail and in diagrammatic representation.

The same arrangement in principle obviously also results when a double-threaded knitted fabric 14 according to FIG. 22 is used; FIG. 23 then only shows the yarn system composed of the yarn 36.

Figure 24:
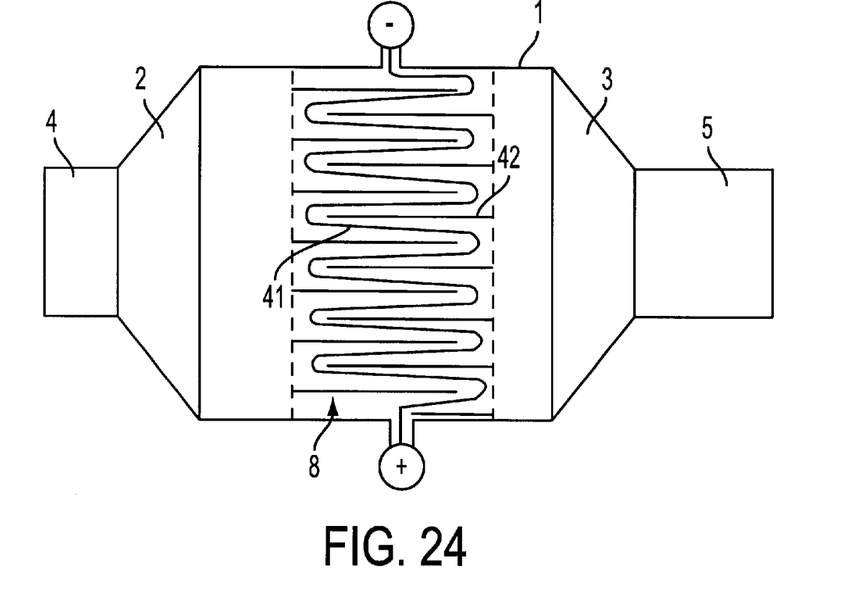
FIGS. 24 and 25 show the catalytic converter according to FIG. 1 in two modified embodiments using the knitted fabric according to FIGS. 22/23, each in axial section, in a side view and in diagrammatic representation.
Figure 25:
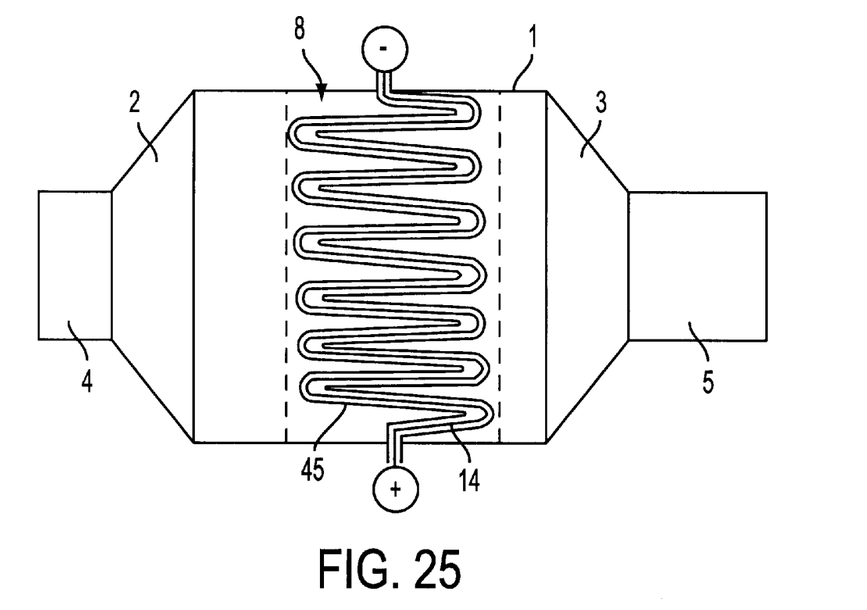

In order to avoid short circuits between the individual layers of the internally electrically heated knitted fabric 14 in the case of a multi-layer catalyst body composed of such a knitted fabric 14 containing electrically conducting fibers, some simple measures can be taken of which two examples are illustrated in FIGS. 24, 25:

In the embodiment according to FIG. 24 which shows a catalytic converter similar to FIG. 1, the catalyst body 8 is composed of a pleated knitted fabric 14, for example corresponding to FIG. 10 or 14. Between the individual layers 41, which lie one on top of the other, of the folded knitted fabric 14 are inserted insulating intermediate layers 42 which, for example, are composed of mica and project from both ends into the catalyst body 8.

In the other embodiment according to FIG. 25, the arrangement is of a type such that, during the folding of the knitted fabric 14, an insulating second knitted fabric 45, for example made of ceramic fiber or glass fiber material, was enclosed in such a way that the two knitted fabrics 14 are folded together in the manner shown.

The electrical internal heating of the catalyst body 8, 8a permits the catalytic converter to be brought rapidly to operating temperature or, as already mentioned at the outset, permits additional desorption processes to proceed, for which purpose, in particular, a double-threaded knitted fabric can also be used in which a thread system can be composed, for example, of activated carbon fibers which are distinguished by a particularly high surface area and thus a high adsorption capacity.

What is claimed is:

1. Apparatus for a catalytic purification of flowing gas, comprising a housing adapted to be arranged in a gas flow path, which housing contains a gas-permeable support in the form of a knitted textile fabric folded to form a stack of contacting superimposed sheets in substantially parallel planes and made of heat resistant fibrous material on which a catalytically active material is applied, wherein the planes of the superimposed sheets are essentially parallel to the flow of gas such that the flow of gas is entirely parallel to the planes of the superimposed sheets and wherein at least a substantial portion of at least one surface of each sheet contacts at least a substantial portion of a surface of an adjacent sheet.

2. Apparatus according to claim 1, in that the fibrous material contains ceramic microfibers.

3. Apparatus according to claim 2, characterized in that the microfibers are polycrystalline mullite fibers.

4. Apparatus according to claim 1, characterized in that the fibrous material contains carbon fibers.

5. Apparatus according to claim 1, characterized in that the surface area of the fibers of the fibrous material is at least 0.1 to 0.4 $m^2/g$.

6. Apparatus according to claim 1, characterized in that the knitted fabric (14) is made at least double-threaded from different fiber materials.

7. Apparatus according to claim 1, characterized in that the knitted fabric (14) contains fibrous material in the form of rovings.

8. Apparatus according to claim 1, characterized in that the knitted fabric (14) contains electrically conducting fibers which are electrically conductively connected to connection means (39, 40) of an electrical power source.

9. Apparatus according to claim 8, characterized in that current flows through the electrically conducting fibers in the knitted fabric (14) in the direction of courses and the electrical connection means extend in the direction of wales over a plurality of courses.

10. Apparatus according to claim 1, characterized in that the knitted fabric (14) is at least in part rolled up.

11. Apparatus according to claim 1, characterized in that the knitted fabric (14) is at least in part pleated.

12. Apparatus according to claim 1, characterized in that the knitted fabric (14) is circular-knitted.

13. Apparatus according to claim 1 for use in an internal combustion engine having an exhaust manifold, characterized in that the housing is formed by the exhaust manifold (30) or a part of the exhaust pipe.

14. Apparatus according to claim 6, further comprising at least one metallic thread in the knitted textile fabric.

15. Apparatus according to claim 4, further comprising activated carbon fibers in the knitted textile fabric.

16. Apparatus according to claim 1, further comprising an additional coating containing $SiO_2$.

17. Apparatus according to claim 1, wherein at least one surface of each sheet contacts a surface of an adjacent sheet.

18. Apparatus according to claim 1, wherein the knitted textile fabric is pleated to form the stack of contacting superimposed sheets.

19. Apparatus for a catalytic purification of flowing gas, comprising:

a housing means for conducting flow of gas;

a gas-permeable, knitted textile fabric means, made of a heat resistant fibrous material and folded to form a stack of contacting superimposed sheets in substantially parallel planes wherein at least a substantial portion of at least one surface of each sheet contacts at least a substantial portion of a surface of an adjacent sheet, for passing the flowing gas entirely parallel to the planes of the superimposed sheets; and a catalytically active material on the fabric means.

20. Apparatus according to claim 19, wherein at least one surface of each sheet contacts a surface of an adjacent sheet.

21. Apparatus according to claim 19, wherein the knitted textile fabric means is pleated to form the stack of contacting superimposed sheets.

22. A method for a catalytic purification of flowing gas, comprising:

flowing a gas through a housing in a direction entirely parallel to a direction of planes of superimposed sheets of a gas-permeable, knitted textile fabric made of a heat resistant fibrous material, comprising a folded stack of the superimposed sheets in substantially parallel planes wherein at least a substantial portion of at least one surface of each sheet contacts at least a substantial portion of a surface of an adjacent sheet; and catalytically purifying the gas by contacting the gas with a catalytically active material on the gas-permeable, knitted textile fabric.

23. Method according to claim 22, wherein at least one surface of each sheet contacts a surface of an adjacent sheet.

24. Method according to claim 22, wherein the knitted textile fabric is pleated to form the stack of contacting superimposed sheets.

* * * * *